July 4, 1950 D. D. GRIEG 2,513,308

ELECTRICAL TIME MODULATED PULSE COMMUNICATION SYSTEM

Filed Sept. 1, 1945 4 Sheets-Sheet 1

INVENTOR.
DONALD D. GRIEG

BY Percy P. Lantzy
ATTORNEY

July 4, 1950 D. D. GRIEG 2,513,308

ELECTRICAL TIME MODULATED PULSE COMMUNICATION SYSTEM

Filed Sept. 1, 1945 4 Sheets-Sheet 2

INVENTOR.
DONALD D. GRIEG

BY Percy P. Lantzy

ATTORNEY

INVENTOR.
DONALD D. GRIEG

BY

Percy P. Lantzy
ATTORNEY

ELECTRICAL TIME MODULATED PULSE COMMUNICATION SYSTEM

Filed Sept. 1, 1945 4 Sheets-Sheet 4

INVENTOR.
DONALD D. GRIEG

BY Percy P. Lantzy
ATTORNEY

Patented July 4, 1950

2,513,308

UNITED STATES PATENT OFFICE 2,513,308

ELECTRICAL TIME MODULATED PULSE COMMUNICATION SYSTEM

Donald D. Grieg, Forest Hills, N. Y., assignor to Federal Telephone and Radio Corporation, New York, N. Y., a corporation of Delaware Application September 1, 1945, Serial No. 614,079

6 Claims. (Cl. 179—15)

This invention relates to a communication system for transmitting and receiving two separate signals on each pulse of a single signal modulated pulse wave. More particularly it deals with the method and the means for producing such a wave from a base wave and two separate sources of signal energy.

It is an object of this invention to produce a wave carrying a train of pulses wherein each pulse carries two separate signals in an efficient, economic and effective manner.

Another object is to transmit and receive such a signal modulated pulse wave.

Another object is to demodulate such a pulse wave into the two separate signals modulated thereon.

Another object is to modulate two signals on one pulse wave, wherein one signal is modulated on the leading edge of the pulse and another signal is modulated on the trailing edge of each pulse.

Another object of this invention is to provide a system for communicating two separate signals on a single time modulated pulse whereby cross-talk between the two signals is avoided when they are demodulated.

Still other objects and features of this invention will appear from time to time in the description which follows:

The system of this invention includes a source of a simple base wave such as a sine wave, a constant frequency pulse wave, a saw-tooth wave, or the like, and two sources of signal energy, such as audio signals. From this base wave are produced two pulse trains, each of which is time modulated according to one of the sources of signal energy. This function may be carried out by first shaping, delaying and/or changing the phase of the base wave and then modulating the resulting wave or waves according to the signals, such as by a modulating clipping device. The two resulting modulated waves are then interleaved or mixed to form a new pulse wave wherein the pulses of each separate modulated wave are out-of-phase with each other and two adjacent pulses (one from each modulated wave) are joined to form a single pulse. This combined wave may be produced by a mixer, a mixer and a trigger circuit, or another suitable combining device so that each pulse of the final wave will have one time modulated signal on its leading edge and another time modulated signal on its trailing edge. The resulting wave may then be transmitted, received, and demodulated. The demodulating means comprises a means for separating the leading and trailing edge of each pulse of the received wave such as by a differentiating circuit and then time demodulating each of the resulting separated pulse waves to reproduce the original signals.

These and other features and objects of this invention will become more apparent upon consideration of the following detailed description of the following embodiments to be read in connection with the accompanying drawings in which.

Figure 1:
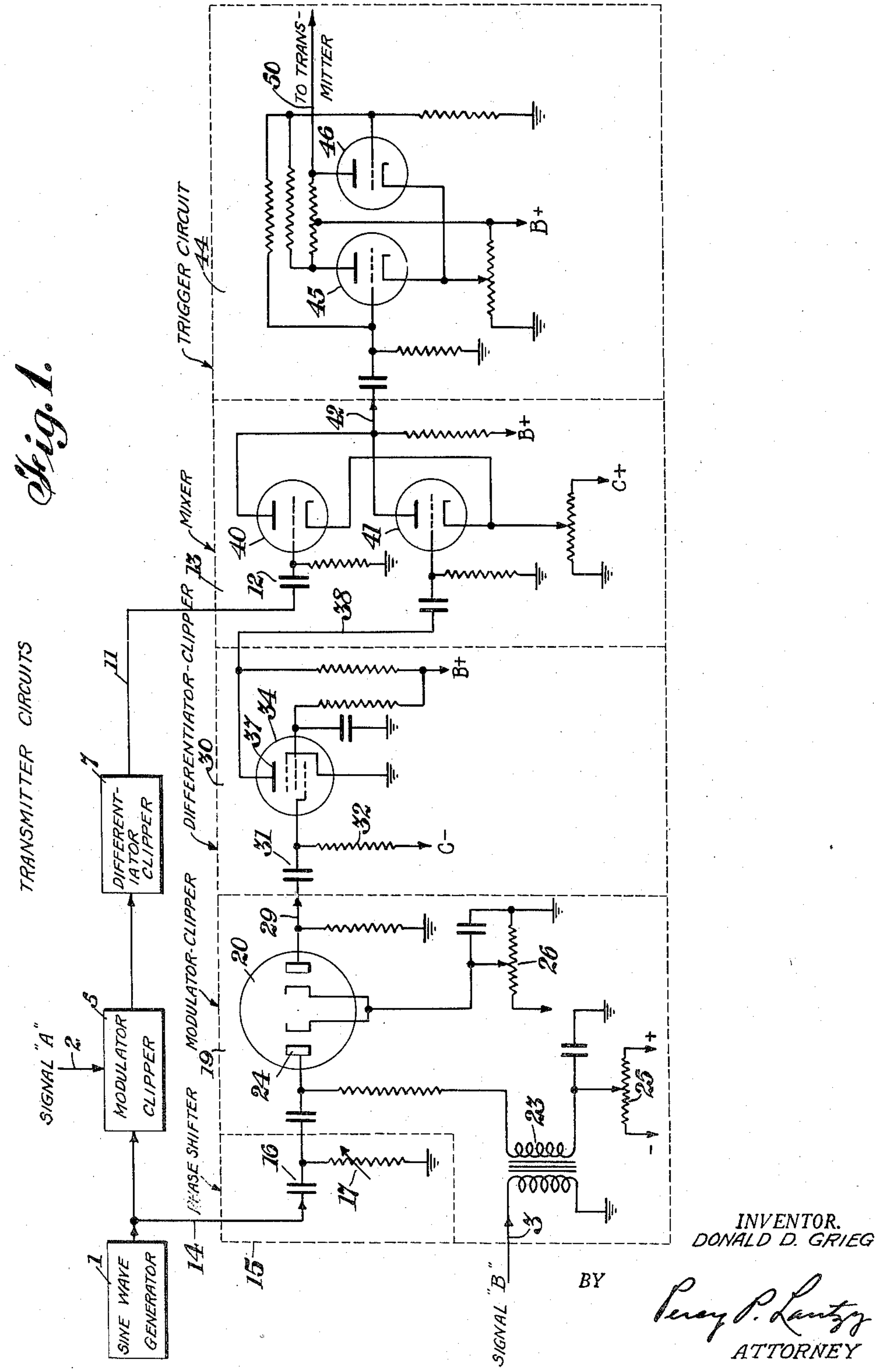
Fig. 1 is a schematic wiring diagram, partially in block, of one form of a circuit for producing the time modulated pulse wave of this invention.
Figure 2:
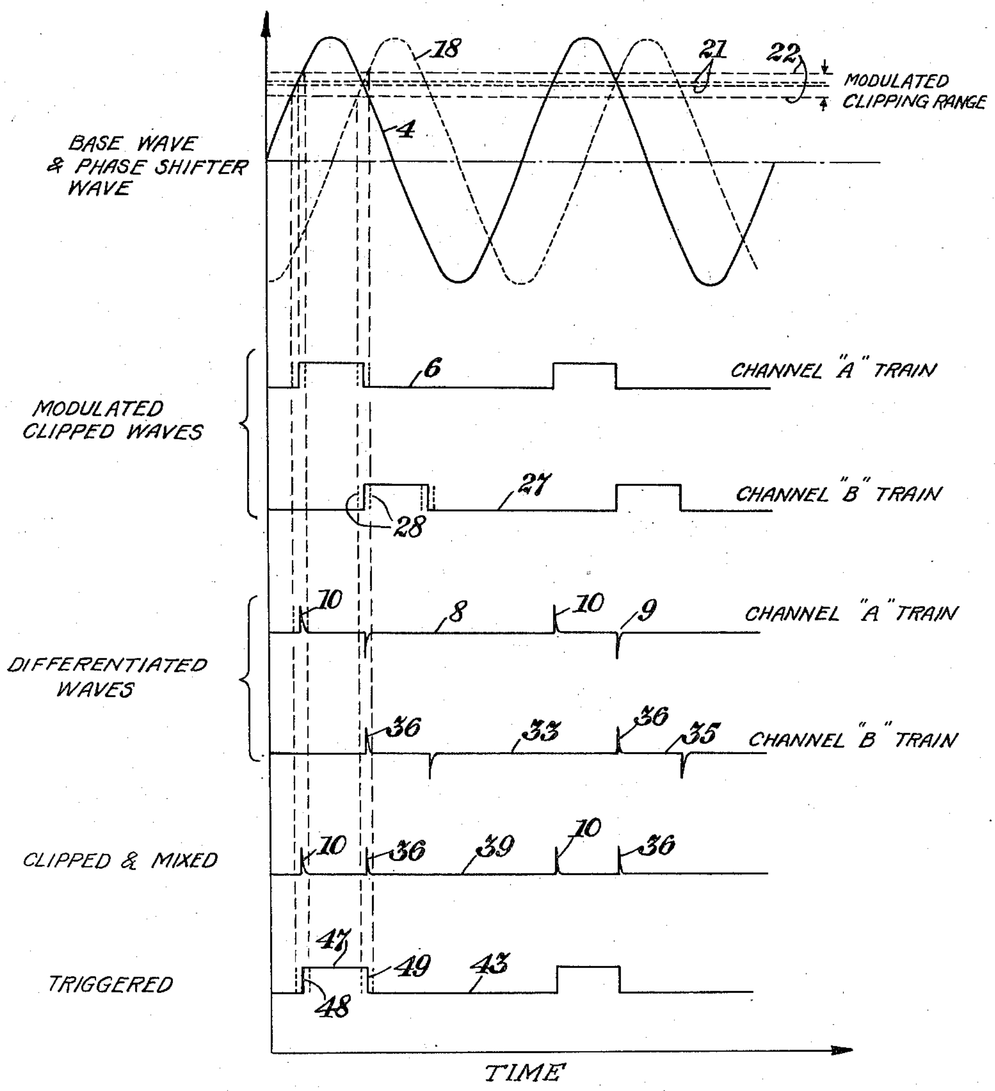
Fig. 2 is a graph illustrative of the different wave forms produced in the system disclosed in Fig. 1.

Referring now to Figs. 1 and 2 of the drawings, there is shown a circuit comprising a base wave generator 1, such as a sine wave generator, and two separate sources of signal energy 2 and 3 hereinabove called signal "A" and signal "B." The sine wave 4, (Fig. 2) from the generator 1, is modulated in the modulator clipper 5 to produce a train of pulses, such as that shown at 6 (Fig. 2). The modulator clipper 5 may be any one of known forms of gate clipper clipping between two levels and may be of the double diode type. The clipping levels are shifted by the applied signal which varies the bias on the diodes of the clipper. Both the leading and trailing edges of the pulse wave 6 are time modulated according to the same signal "A." This wave is then differentiated in the differentiator clipper 7 to produce a wave 8 which is then clipped along the level 9 so that only the leading edge pulses 10 from wave 6 pass from the clipper 7 through line 11 and condenser 12 to the mixer 13. The circuits of the blocks 5 and 7 may be the same as corresponding blocks shown in detail for the channel of signal "B" the description of which now follows.

In order to produce a similar train of pulses modulated according to signal "B" from the same sine wave 4, sine wave 4 is passed through branch line 14 to the phase shifter 15 comprising condenser 16 and variable resistor 17 to delay sine wave 4 to produce the wave 18, shown dotted in Fig. 2. This delayed sine wave is passed to the modulator clipper 19, similar to that of 5 which may comprise a double diode 20 to produce a double constant width clipping at levels 21, which levels vary from less to more positive positions between the limits 22 in accordance with the signal "B" connected through transformer 23. The variable resistances 25 and 26 determine the width between the clipping levels 21. Since the clipping levels 21 vary vertically along the sloping portion of the wave 18, the leading and trailing edges of the pulses of resulting clipped wave 27 are horizontally or time modulated within the limits 28. Similarly as in the pulse train 6 of signal "A," both the leading and the trailing edges of pulses in wave 27 are time modulated toward and away from each other according to the energy in signal "B."

Wave 27 then passes from the clipper modulator 19 through line 29 to the differentiator and amplifier clipper network 30 similar to that of 7. The differentiator circuit comprises condenser 31 and resistance 32, which produces the wave 33 consisting of a series of positive pulses 36 corresponding to the leading edges of the pulses of wave 27, and a series of negative pulses corresponding to the trailing edges of the pulses in wave 27. The amplifier clipper tube 34 is biased by the C— connected to the resistor 32 so as to clip the wave 33 along the level 35 to produce a wave consisting only of the positive pulses 36. Pulses 36 then pass from plate 37 of the tube 34 to the mixer 13 through line 38.

In order to prevent the pulse waves from the clipper 7 from feeding back into the clipper 30 and vice versa lines 12 and 38 are connected to the grids of triodes 40 and 41 respectively, from which a new wave 39, Fig. 2, is withdrawn over line 42.

To convert pulses 10 and 36 into the wider pulse of the wave 43, they are passed through a trigger circuit shown at 44 which may comprise two triodes 45 and 46 connected in such a manner so that when pulse 36 is transmitted to the grid of triode 45 it will cut out the triode 46 and fire tube 45 which will continue to pass current until the second pulse 10 passes and then tube 45 will be cut out and tube 46 will fire and the current will be reversed through the two tubes thereby forming one pulse 47 from the two separate pulses 10 and 36. The trigger circuit 44 may be any suitable form of counting or commutating arrangement including two tubes, such as in the form of a multivibrator having two amplitude levels at which it is stable and which multivibrator is tripped from one level to a second level by the first incoming pulse and return to the orginal level by the second pulse. Since pulses 10 and 36 are each separately time modulated, two separate signals "A" and "B" are represented by the edges 48 and 49 of the pulse 47. The wave 43 collected from the plates of the tubes 45 and 46 is then passed through line 50 to a suitable transmitter, such as an ultra high frequency transmitter, for transmission of the resulting pulse wave 43 to any desired sources such as over a high frequency cable or a given radio frequency.

Figures 3, 4:
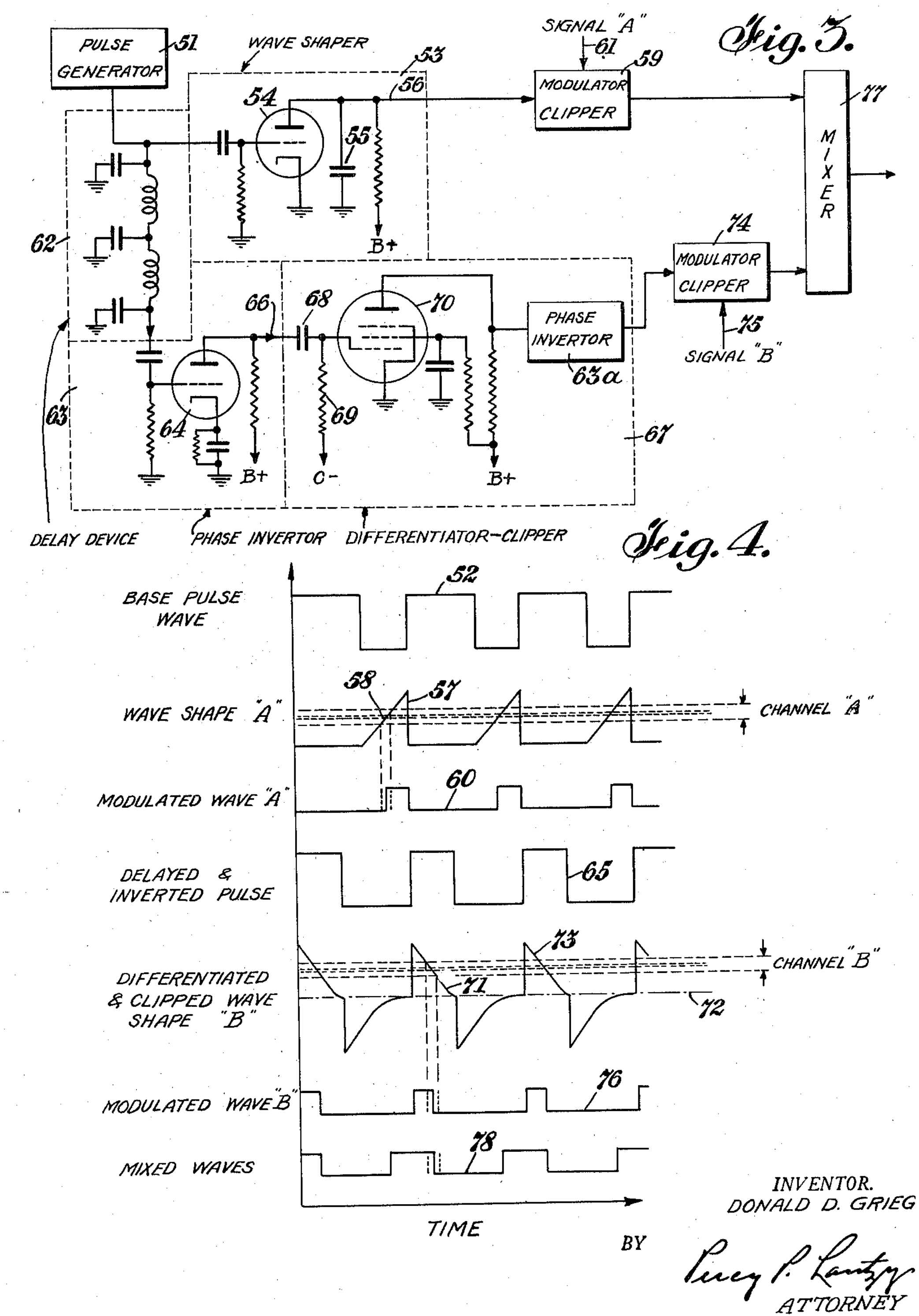
Fig. 3 is a schematic wiring diagram partially in block, of another form of a circuit for producing the time modulated pulse wave of this invention.
Fig. 4 is a graph illustrative of the different wave forms produced in the system disclosed in Fig. 3.

Another circuit for producing a wave similar to wave 43 is shown in Fig. 3. Referring to Figs. 3 and 4 a pulse generator 51 may be employed to produce a wave having the form shown at 52 in Fig. 4. This wave is then shaped so that signals "A" and "B" may be applied to energy thereof, to produce the desired pulse modulated wave.

For signal "A" the wave is passed through wave shaper 53 comprising the triode 54 and condenser 55 wherein the shape of the wave which is withdrawn through line 56 is like that shown at 57 in Fig. 4, having a sloping edge 58 for each pulse. This wave may be amplified if desired and passed through a modulator clipper 59, similar to that described at 30 in Fig. 1, to produce a wave 60 in which the leading edge of each pulse is time modulated according to the signal "A," introduced into the time modulator 59 at 61.

In order to produce a similar pulse wave in which the trailing edge is time modulated according to the energy in signal "B," the original pulse wave 52 is passed through a delay device 62 which may comprise a network of inductances of capacitances to assimulate a transmission line. The delayed wave then is passed into phase inverter 63 comprising a triode 64 for inverting the delayed pulse wave 52 to form the wave 65 withdrawn from the plate of tube 64. Wave 65 is now passed through line 66 to a differentiator clipper 67, which may comprise a condenser 68, resistor 69 and an amplifying tube 70, similar to that shown in differentiator clipper 30 in Fig. 1, but having different impedance values so that the wave entering the grid of the tube 70 from the differentiator will have the form 71 shown in Fig. 4, and may be clipped along line 72 to separate the positive pulses having sloping trailing edges 73, complementary to edges 58 of wave 57. Since tube 70 inverts the wave 72 the output from 72 is then passed thru another phase inverter 63*a* similar to 63. These resulting positive pulses from phase inverter 63*a* are time modulated in the clipper modulator 74, similar to that shown in 59, but with a phase inverter added by the signal "B" introduced at 75. From the modulator clipper 74 is withdrawn the pulse train 76 having the trailing edge of each pulse time modulated in accordance with the signal energy "B."

The two time modulated pulse trains 60 and 76 are now passed into the mixer 77, similar to the mixer 13 in Fig. 1, wherein the new pulse wave 78 is produced having the leading edge of each pulse modulated according to signal "A" and the trailing edge of the pulse time modulator according to signal "B." It should be noted that the trailing edge of each pulse of wave train 60 and the leading edge of each pulse of wave train 76, are in phase with each other so that there is substantially no reproduceable pulse occurring in the center of each pulse produced in wave 78. However, if another pulse does occur at the center of each pulse on wave 78 due to inadvertent over or underlap of the pulses 60 and 76, it may easily be removed by a passing of the wave 78 through a suitable filter or limiter before it is applied to a transmitter. Both pulse waves 43 and 78 are substantially the same form.

Figure 5:
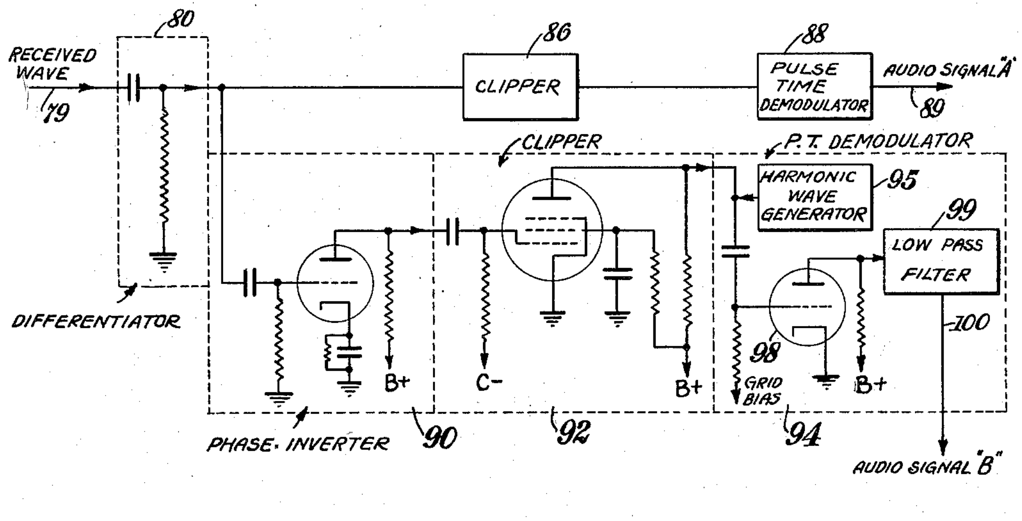
Fig. 5 is a schematic wiring diagram, partially in block, of a demodulating circuit for the pulse waves produced by the system shown in Fig. 1 or Fig. 3.
Figure 6:
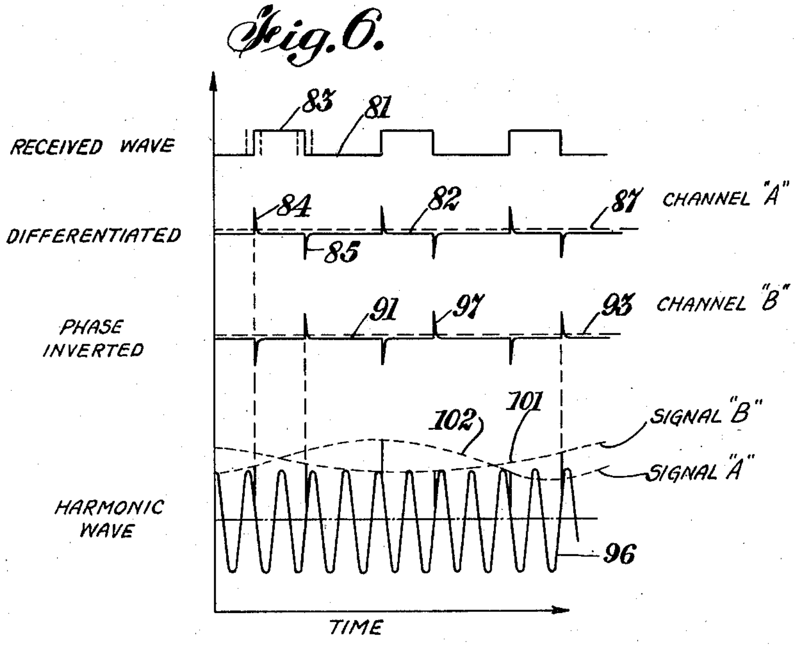
Fig. 6 is a graph illustrative of the different wave forms produced in the system shown in Fig. 5.

Referring now to Figs. 5 and 6 the transmitted pulse waves 43 or 78 are received over line 79 and passed through a differentiating network 80 comprising a condenser and resistor similar to that previously described. For convenience wave form 43 or 78 is reproduced as wave form 81 in Fig. 6, which after being differentiated has the form 82, wherein the leading edges of each pulse 83 of wave 81 form positive pulses 84 and the trailing edges of each pulse 83 thereof form negative pulses 85. Wave 82 then is passed through a suitable clipper 86 which clips the wave 82 along the line 87 to produce a series of positive pulses 84 which are passed to a suitable pulse time demodulator 88 from which the signal "A" is again reproduced and withdrawn through line 89.

For signal "B," the differentiated wave 82 is also passed through a phase inverter 90, similar to that of 63 shown in Fig. 3, from which wave 91 is withdrawn and passed into clipper 92, similar to 86, wherein the positive pulses (which correspond to the trailing edges of the pulses 83 of wave 81) are removed by clipping along the level 93. The clipped wave 91 then is passed to a pulse time demodulator such as shown at 94 and disclosed in copending application, Ser. No. 459,959, filed September 28, 1942, now Patent No. 2,416,306, granted February 25, 1947. This pulse time demodulator may comprise a harmonic sine wave generator 95 which produces the wave 96 (Fig. 6) upon which the positive pulses 97 of wave 91 are superimposed. The resulting composite wave having pulses spaced at different positions along the sloping edges of the sine wave 96, is passed through the low pass filter 99 from which the audio signal "B" is withdrawn through line 100. The audio signal "B" has the form of the dotted wave 101 shown in Fig. 6. Signal wave "A" is similarly shown in Fig. 6 by dotted wave 102.

From the above description it can be seen that a single pulse may carry two separate signals one time modulated on its leading edge and the other time modulated on its trailing edge.

While the principles of the invention have been described in connection with specific apparatus it is to be clearly understood that this description is made only by way of example and not as a limitation on the scope of the invention as defined in the objects and the accompanying claims.

I claim:

1. A system for producing a pulse wave carrying one time modulated signal on the leading edge of each pulse and a different time modulated signal on the trailing edge of each pulse, comprising: a base wave source, two sources of different signal energy, means to change the phase of said base wave, means to produce two pulse trains one from the original base wave and another from the base wave out of phase with the original base wave, means for respectively time modulating the pulses of said trains with energy from said signal sources, means to interleave the pulses of said pulse trains to produce a new pulse wave, and trigger circuit means to combine successive pairs of pulses in said new pulse wave to form a series of single pulses, each bearing two signals.

2. A system for producing a pulse wave carrying one time modulated signal on the leading edge of each pulse and a different time modulated signal on the trailing edge of each pulse, comprising: a base wave source, two sources of different signal energy, means to change the phase of said base wave, means to produce two pulse trains one from the original base wave and another from the base wave out of phase with the original base wave, the means to produce one of said pulse trains including a differentiating means and a clipping means, means for respectively time modulating the pulses of said trains with energy from said signal sources, means to interleave the pulses of said pulse trains to produce a new pulse wave, and means to combine successive pairs of pulses in said new pulse wave to form a series of single pulses, each bearing two signals.

3. A system for producing a pulse wave carrying one time modulated signal on the leading edge of each pulse and a different time modulated signal on the trailing edge of each pulse, comprising: two sources of signal energy, means to produce two pulse trains respectively time modulated at one edge per pulse with energy from said signal sources, means controlling said pulse trains so that the unmodulated edges of corresponding pulses of said pulse trains coincide and means to combine corresponding pulses, one from each train, into a single pulse of the desired pulse wave.

4. The system for producing a pulse wave carrying one time modulated signal on the leading edge of each pulse and a different time modulated signal on the trailing edge of each pulse, comprising: a base wave, two sources of different signal energy, means for shaping said base wave to produce two base pulse waves, one of which has pulses with a sloping leading edge and the other of which has pulses with a sloping trailing edge, said base pulse waves being out of phase with each other, means to modulate said two pulse waves respectively in time modulation with energy from said signal sources, and a mixing means to combine said pulse waves into a single pulse wave wherein adjacent pulses, one from each pulse wave, form a single pulse thereof.

5. The system of claim 4 wherein said means to produce said base pulse wave having a sloping trailing edge includes means to delay the base wave and means to differentiate and clip the resulting delayed base wave.

6. The system of claim 4 wherein said means for producing the two pulse trains includes means to produce a base wave having a sloping edge and means to clip said base wave along said sloping edge at various levels corresponding to the energy from said signal sources.

DONALD D. GRIEG.

REFERENCES CITED

The following references are of record in the file of this patent:

UNITED STATES PATENTS

| Number | Name | Date |
|---|---|---|
| 2,086,918 | Luck | July 13, 1937 |
| 2,391,776 | Fredendall | Dec. 25, 1945 |
| 2,406,790 | Beatty et al. | Sept. 3, 1946 |
| 2,418,116 | Grieg | Apr. 1, 1947 |
| 2,434,894 | Ambrose | Jan. 27, 1948 |
| 2,434,965 | Shepard | Jan. 27, 1948 |